UNITED STATES PATENT OFFICE.

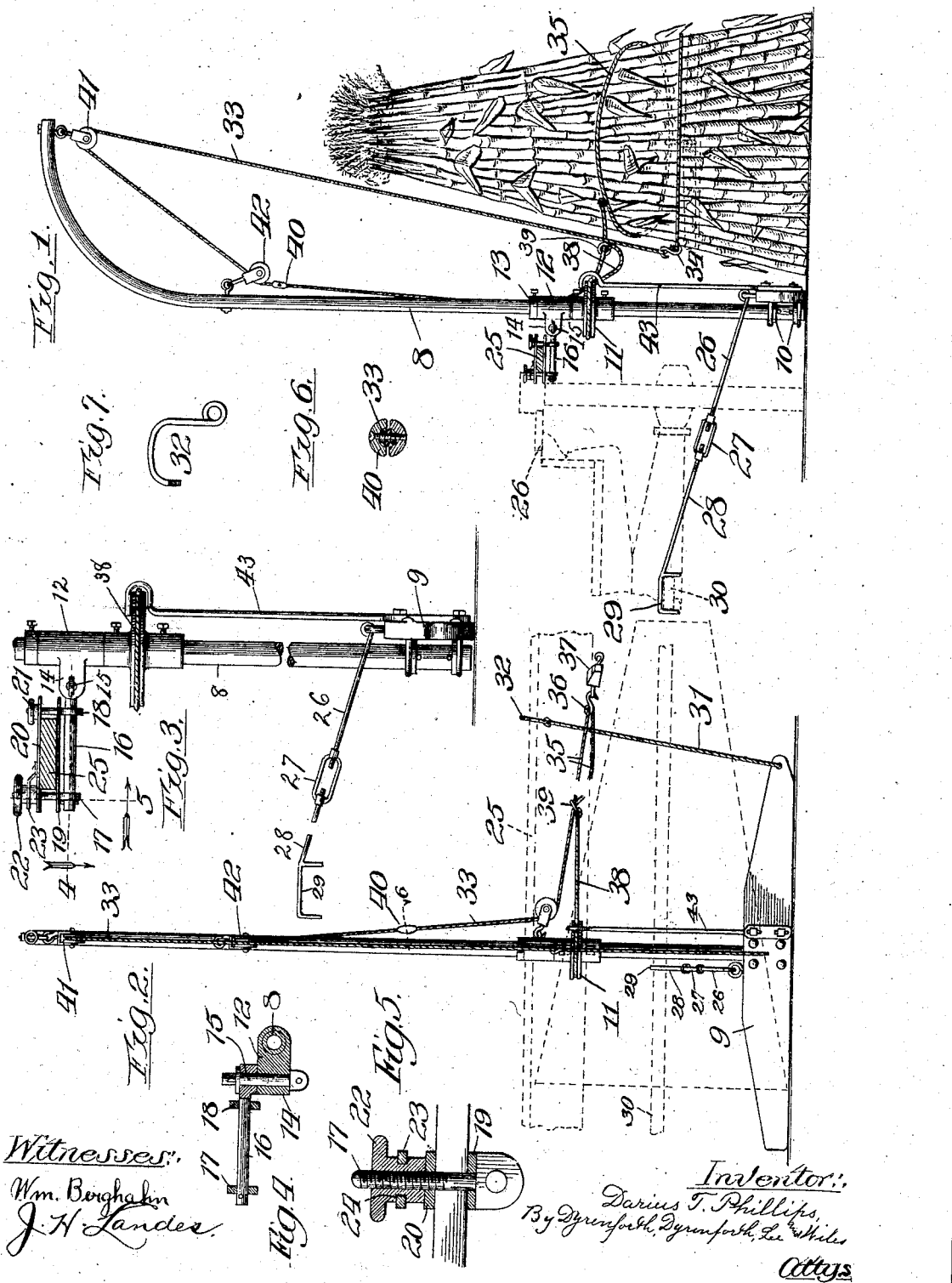

DARIUS TENNET PHILLIPS, OF CHICAGO, ILLINOIS.

CORN-SHOCK LOADER.

No. 850,543.     Specification of Letters Patent.     Patented April 16, 1907.

Application filed July 18, 1906. Serial No. 326,662.

*To all whom it may concern:*

Be it known that I, DARIUS TENNET PHILLIPS, a citizen of the United States, residing at Chicago, in the county of Cook and State of Illinois, have invented a new and useful Improvement in Corn-Shock Loaders, of which the following is a specification.

My invention relates to improvement in transportable derricks of a type adapted to be attached to a wagon and drawn therewith across a field to operate as a convenient means for facilitating the loading of heavy corn-shocks or the like into the wagon.

My object is to provide a shock-loading derrick of an improved construction which will render it particularly desirable and convenient for its purpose.

In practice the wagon is drawn by horses, the loading being performed by another horse who travels at the side of the draft-horses.

In the drawings, Figure 1 is a view illustrating my improved shock-loader in operation; Fig. 2, a partly-broken elevation of the same viewed from another angle; Fig. 3, an enlarged broken elevation illustrating more plainly features of construction of the derrick; Fig. 4, a plan section taken on line 4 in Fig. 3; Fig. 5, a broken and enlarged section taken on line 5 in Fig. 3; Fig. 6, an enlarged section through an adjustable catch or stop carried by the derrick-rope, and Fig. 7 a hook forming one of the details of construction.

The mast, or derrick-leg 8, of the form shown is mounted at its lower end upon a runner 9 to turn in bearings 10 in the horizontal plane. Fixed to the mast in the position shown is a pulley 11, above which is a loose sleeve 12, confined between the pulley and a fixed collar 13. The pulley and collar are fastened to the mast by means of set-screws, so that they and the loose sleeve 12 may be raised and lowered, as desired. The sleeve 12 is formed with a perforated projection 14, receiving a pin 15, on which is pivoted a short shaft 16. Mounted on the shaft 16 are eyebolts 17 18, passing through a lower clamping-plate 19 and an upper clamping-plate or hasp 20. On the bolt 18 above the hasp 20 is a clamping-nut 21, and the hasp carries a clamping-nut 22, held against removal by a bracket-piece 23, having an opening engaging an annular socket 24 in the nut. The mast is pivotally fastened at its sleeve portion 12 to the usual horizontal or nearly horizontal side board or strip 25 of a wagon 26, the said board being received between the plate 19 and hasp 20, which are securely fastened thereto by the bolts 17 18 and nuts 21, 22, as indicated. When it is desired to remove the device from the wagon, the nut 21 is loosened and the nut 22 unscrewed from the bolt 17 to release the latter and permit the hasp to be swung laterally and disengage the board 25, as will be readily understood. The means shown for attaching the derrick to the side-board of the wagon may of course be varied as desired.

Pivotally connected with the runner, as shown, is a rod 26, connected by a turnbuckle 27 with a rod 28, the end 29 of which is shaped, as shown, to engage the reach 30 of the wagon. At one end the runner 9 is connected, by means of a rope 31, carrying a hook 32, with the board 25, as shown in Fig. 2. The connecting means described hold the runner and mast firmly in a position adjacent to the side of the wagon, so that the runner will slide upon the ground as the wagon is moved and form a support for the mast. While moving over the ground, the runner may oscillate longitudinally to override small obstacles.

33 is a rope provided at one end with a hook 34 and having a loop 35 at its opposite end, where it also carries a sliding hook 36 for attachment to the clevis of a whiffletree 37. Fastened at one end to the pulley 11 is a short rope 38, at its opposite end carrying a small ring 39, surrounding the rope 33. Fastened in a desired location upon the rope 33 is a small split sleeve-piece or button 40. It consists of two parts, as shown in Fig. 6, fastened together through the rope by means of a screw, as indicated. Between its ends the rope 33 passes through pulleys 41 42, mounted upon the mast in the manner and in the positions shown. The button 40 passes readily through the pulleys, but is too large in diameter to pass through the ring 39.

In practice to load the shock upon the wagon the latter is drawn with the derrick to one side of the shock, and the free end of the rope 33 is passed around the shock, the hook 34 being caused to engage the rope to form a shock-engaging loop. The loop portion 35 at the opposite end of the rope is also dropped over the top of the shock. The horse attached to the whiffletree is then driven forward. In his first movement the engagement of the loop 35 with the shock causes the latter to be upset and extend along the ground. In the further movement of the horse the hook 35 is drawn along past the end of the shock and disengaged therefrom, and the opposite end of the rope tightens about the shock and then raises the latter to the proper height with reference to the wagon. When this point is reached, the button 40 engages the ring 39, whereby in the further travel of the horse the rope 38 is drawn to turn the pulley and mast axially and swing the shock over the wagon to the desired position thereon. The horse is then backed to lower the shock onto the wagon, when the rope 33 may be disengaged from the shock ready for a new operation.

Extending from the runner and firmly fastened thereto is rod 43, which extends around the pulley 11 in a manner to hold the rope 38 against sliding downward from the pulley-face.

It is important to provide means such as described for upsetting the shock before it is raised to prevent upward slipping thereon of the looped rope 33, as would be the case if the shock remained standing during the initial lifting pull thereon.

The rope 33 is, in effect, power-operated draft mechanism, the source of power being, by preference, a horse to which the rope is attached at one end. In operation this power-operated draft mechanism upsets the shock in its initial movement, in its further movement lifts the shock, and in its final movement by drawing upon the rope 38 turns the upper part of the derrick laterally to swing the shock to the desired position over the wagon, so that when the horse is backed or power reversed the shock is lowered into the proper position on the wagon.

What I claim as new, and desire to secure by Letters Patent, is—

1. In a shock-loading derrick, of the character described, the combination with the derrick-leg having a laterally-extending upper portion, of means on the derrick for attaching it pivotally to a wagon, power-operated draft mechanism on the derrick, for engaging and lifting the shock, provided with means operating in its final lifting movement to swing the upper part of the derrick laterally, for the purpose set forth.

2. In a shock-loading derrick, of the character described, the combination with the derrick-leg having a laterally-extending upper portion, of means on the derrick for attaching it pivotally to a wagon, power-operated draft mechanism on the derrick provided with means for engaging the shock and upsetting it in the initial movement of the draft mechanism, provided also with means for attaching it to the shock whereby in its further movement the shock is lifted, and provided with means operating in its final lifting movement to swing the upper part of the derrick laterally, for the purpose set forth.

3. A shock-loader comprising, in combination, a derrick-leg, a traveling support on which the leg is pivotally mounted, means for pivotally attaching the leg to a wagon, pulleys on the leg, a shock engaging and lifting rope, or the like, extending over the pulleys adapted at one end for attachment to a power, a rope, or the like, eccentrically engaging the leg and so disposed with relation to the shock-engaging rope as to be drawn upon in the final shock-lifting movement of the latter to turn the leg on its axis, for the purpose set forth.

4. A shock-loader comprising, in combination, a derrick-leg, a traveling support on which the leg is pivotally mounted, means for pivotally attaching the leg to a wagon, pulleys on the leg, a shock engaging and lifting rope, or the like, extending over the pulleys and forming draft mechanism adapted at one end for attachment to a shock, and at its opposite end for attachment to a power, a shock-engaging loop on the rope operating in the initial movement of the draft mechanism to upset and then disengage the shock, a rope, or the like, eccentrically engaging the leg and so disposed with relation to the shock-engaging rope as to be drawn upon in the final shock-lifting movement of the latter to turn the leg on its axis, for the purpose set forth.

5. In a shock-loading derrick of the character described, the combination with the derrick-leg and runner on which the leg is pivotally mounted, of means for connecting the runner with the reach of a wagon, and means for connecting the leg pivotally to a side-board of the wagon.

DARIUS TENNET PHILLIPS.

In presence of—
　J. H. LANDES,
　C. W. WASHBURNE.